United States Patent
Cracknell

(10) Patent No.: US 7,213,567 B2
(45) Date of Patent: May 8, 2007

(54) PROCESS AND APPARATUS FOR CONTROLLING THE PERFORMANCE OF A HOMOGENEOUS CHARGE COMPRESSION IGNITION (HCCI) ENGINE

(75) Inventor: Roger Francis Cracknell, Chester (GB)

(73) Assignee: Shell Oil Company, Houston, TX (US)

( * ) Notice: Subject to any disclaimer, the term of this patent is extended or adjusted under 35 U.S.C. 154(b) by 177 days.

(21) Appl. No.: 10/537,078

(22) PCT Filed: Dec. 3, 2003

(86) PCT No.: PCT/EP03/50936

§ 371 (c)(1),
(2), (4) Date: Jun. 1, 2005

(87) PCT Pub. No.: WO2004/051060

PCT Pub. Date: Jun. 17, 2004

(65) Prior Publication Data

US 2006/0086324 A1   Apr. 27, 2006

(30) Foreign Application Priority Data

Dec. 3, 2002  (EP) .................................. 02258334

(51) Int. Cl.
F02B 47/00 (2006.01)
(52) U.S. Cl. ........................... 123/304; 123/3; 123/575
(58) Field of Classification Search .................... 123/3, 123/304, 575
See application file for complete search history.

(56) References Cited

U.S. PATENT DOCUMENTS

| | | | |
|---|---|---|---|
| 6,159,256 A | 12/2000 | Bonville, Jr. et al. ........... 48/61 |
| 6,378,489 B1 | 4/2002 | Stanglmaier et al. ........ 123/304 |
| 6,463,907 B1 | 10/2002 | Hiltner ........................ 123/304 |
| 6,981,472 B2 * | 1/2006 | Bromberg et al. .............. 123/3 |
| 2001/0045375 A1 | 11/2001 | Thijssen et al. ............. 208/211 |
| 2003/0052041 A1 * | 3/2003 | Erwin et al. ................... 208/15 |
| 2004/0055586 A1 * | 3/2004 | Botti et al. ................. 123/585 |
| 2004/0099226 A1 * | 5/2004 | Bromberg et al. .............. 123/3 |

FOREIGN PATENT DOCUMENTS

| | | |
|---|---|---|
| WO | 99/48805 | 9/1999 |
| WO | 00/61707 | 10/2000 |

OTHER PUBLICATIONS

Michael J. Baird, et. al., Industrial & Engineering Chemistry Product Research and Development, vol. 19, No. 2 Jun. 1980, pp. 175-191.
John Boyer, et. al., Chemical Engineering, May 1993, vol. 100, No. 5, McGraw Hill publishing.

* cited by examiner

Primary Examiner—Erick Solis

(57) ABSTRACT

A process for controlling the performance of a homogeneous charge compression (HCCI) engine in a vehicle having a hydrocarbon fuel reservoir which process is provided. The octane or cetane number of hydrocarbon fuel being supplied to the HCCI engine is adjusted by: (a) converting a portion of hydrocarbon fuel from the hydrocarbon fuel reservoir to synthesis gas; (b) converting synthesis gas produced in step (a) to a mixture of hydrocarbons having an octane number less than or a cetane number higher than that of the hydrocarbon fuel of the hydrocarbon fuel reservoir using a Fischer Tropsch process; (c) delivering (i) a portion of hydrocarbon fuel from the hydrocarbon fuel reservoir and (ii) a portion of the mixture of hydrocarbons produced in step (b) to the HCCI engine; and (d) varying the amounts of (i) and (ii) in step (c) in order to adjust the octane or cetane number of the hydrocarbon fuel being supplied to the HCCI engine. Apparatus suitable for carrying out this process is also disclosed.

20 Claims, 4 Drawing Sheets

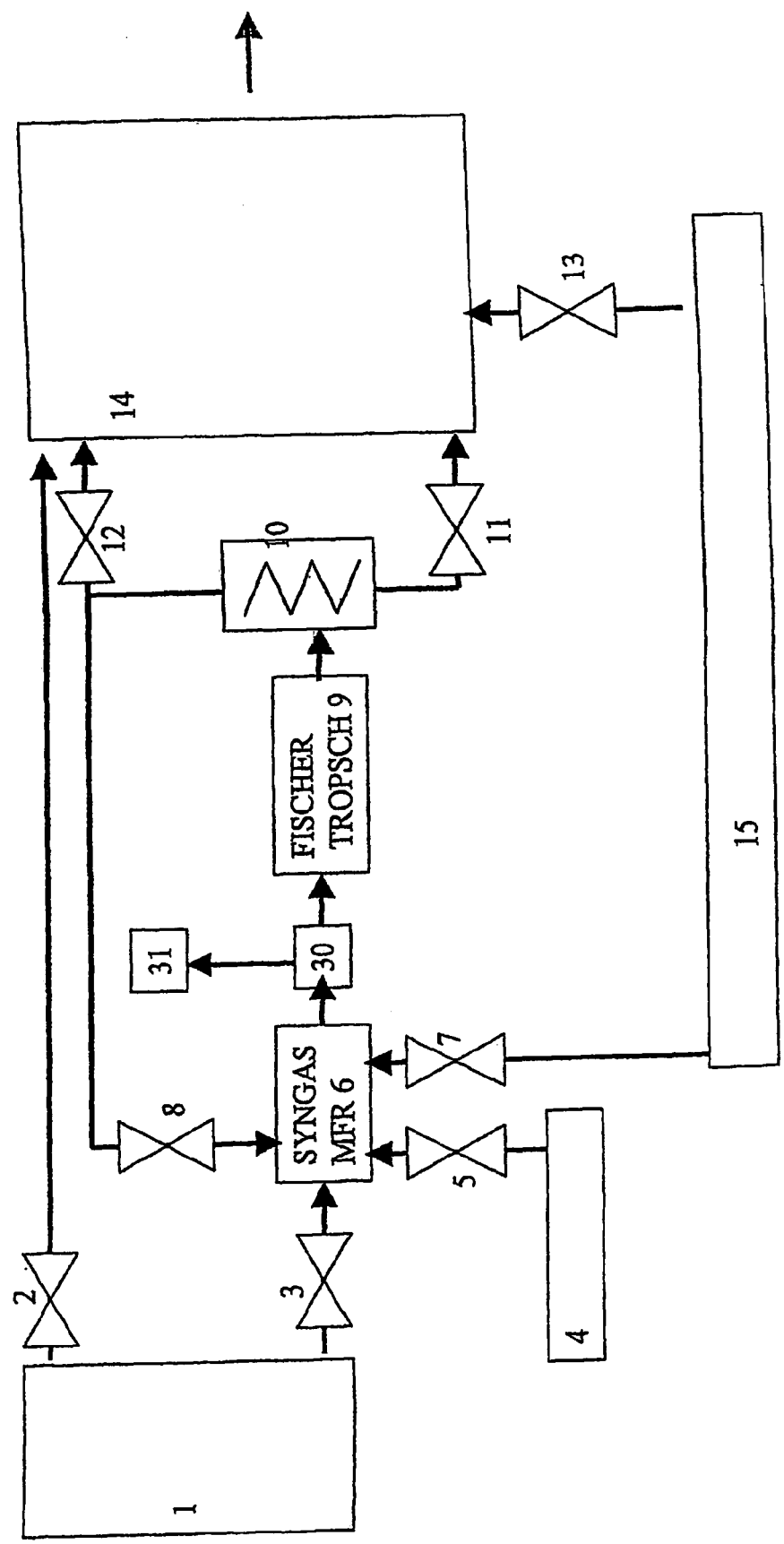

PROCESS AND APPARATUS FOR CONTROLLING THE PERFORMANCE OF A HOMOGENEOUS CHARGE COMPRESSION IGNITION (HCCI) ENGINE

PRIORITY CLAIM

The present application claims priority to European Patent Application No. 02258334.8 filed 3 Dec. 2002.

The present invention relates to a process for controlling the performance of a HCCI engine comprising adjusting the octane or cetane number of a hydrocarbon fuel being delivered to the HCCI engine. The present invention also provides apparatus suitable for use in said process.

Homogeneous Charge Compression Ignition (HCCI) is a distinct combustion mode in which a premixed homogeneous charge of air and fuel is compressed until it autoignites. Unlike conventional Compression Ignition (CI) and Spark Ignition (SI) engines, in an HCCI engine, the combustion reaction initiates at multiple locations simultaneously. A HCCI engine can run on a dilute air and fuel mixture. As a result a HCCI engine operates at a relatively low combustion temperature which leads to low $NO_x$ levels and a level of efficiency normally associated with a CI engine. These advantages make HCCI engines seem an attractive alternative to CI and SI engines.

However, one of the problems associated with HCCI engines is that of controlling ignition timing and combustion over a wide range of operating conditions. Factors which influence HCCI ignition and combustion are temperature, pressure and composition of the fuel and air mixture. The fundamental processes of HCCI combustion make cold starts difficult without some compensating mechanism. Changing the power output (e.g. by varying the load or speed) of an engine requires a change in fuelling rate and therefore a change in charge mixture. This will have an effect on ignition timing and combustion in a HCCI engine and, for example, at high loads, HCCI combustion can become very rapid and intense and difficult to control. As a result of these difficulties, most engines employing HCCI have dual mode combustion systems in which traditional SI or CI combustion is used for operating conditions in which HCCI operation is hard to control. Typically, such an engine is cold-started as an SI or CI engine, then switched to HCCI mode for idle and low- to mid-load operation to obtain the benefits of HCCI in this regime and then switched to SI or CI operation at high load. It is highly desirable to have improved control over the ignition timing of a HCCI engine in order to extend the load range over which it can be operated in HCCI mode.

The present invention provides a process for controlling the performance of a homogeneous charge compression ignition (HCCI) engine in a vehicle having a hydrocarbon fuel reservoir which process comprises adjusting the octane or cetane number of the hydrocarbon fuel being delivered to the HCCI engine by:

(a) converting a portion of hydrocarbon fuel from the fuel reservoir to synthesis gas;

(b) converting synthesis gas produced in step (a) to a mixture of hydrocarbons having an octane number less than or a cetane number greater than that of the hydrocarbon fuel of the fuel reservoir using a Fischer Tropsch process;

(c) delivering (i) a portion of hydrocarbon fuel from the hydrocarbon fuel reservoir and (ii) a portion of the mixture of hydrocarbons produced in step (b) to the HCCI engine; and (d) varying the amounts of (i) and (ii) in step (c) in order to adjust the octane number of the hydrocarbon fuel being supplied to the HCCI engine.

This process provides a way of controlling the ignition timing and the combustion of a HCCI engine. The process of the invention is particularly advantageous in that it can be carried out onboard a vehicle and in that the vehicle need only be fuelled by a single conventional hydrocarbon fuel. A portion of the conventional fuel is reprocessed onboard the vehicle and the products of this reprocessing are used to control the overall octane number of the fuel being supplied to the engine and thereby control the ignition timing.

In this specification the terms "low octane" and "high cetane" are treated as being identical. Similarly, the terms "high octane" and "low cetane" are treated as being identical. In this specification, octane number means Research Octane Number (RON).

The hydrocarbon fuel may be gasoline or a suitable alternative hydrocarbon fuel. Preferably the hydrocarbon fuel has an octane number (RON) greater than 92.

The HCCI engine is any engine which can work in HCCI mode and may be suitable for use in most vehicles powered by internal combustion engine, particularly light duty vehicles such as passenger cars and small automobiles.

The invention will now be described in more detail with reference to, but not limited by, the following figures:

FIG. 4 is a schematic of a process configuration similar to that of FIG. 1 which includes a stage for the removal of hydrogen.

Figure 1:
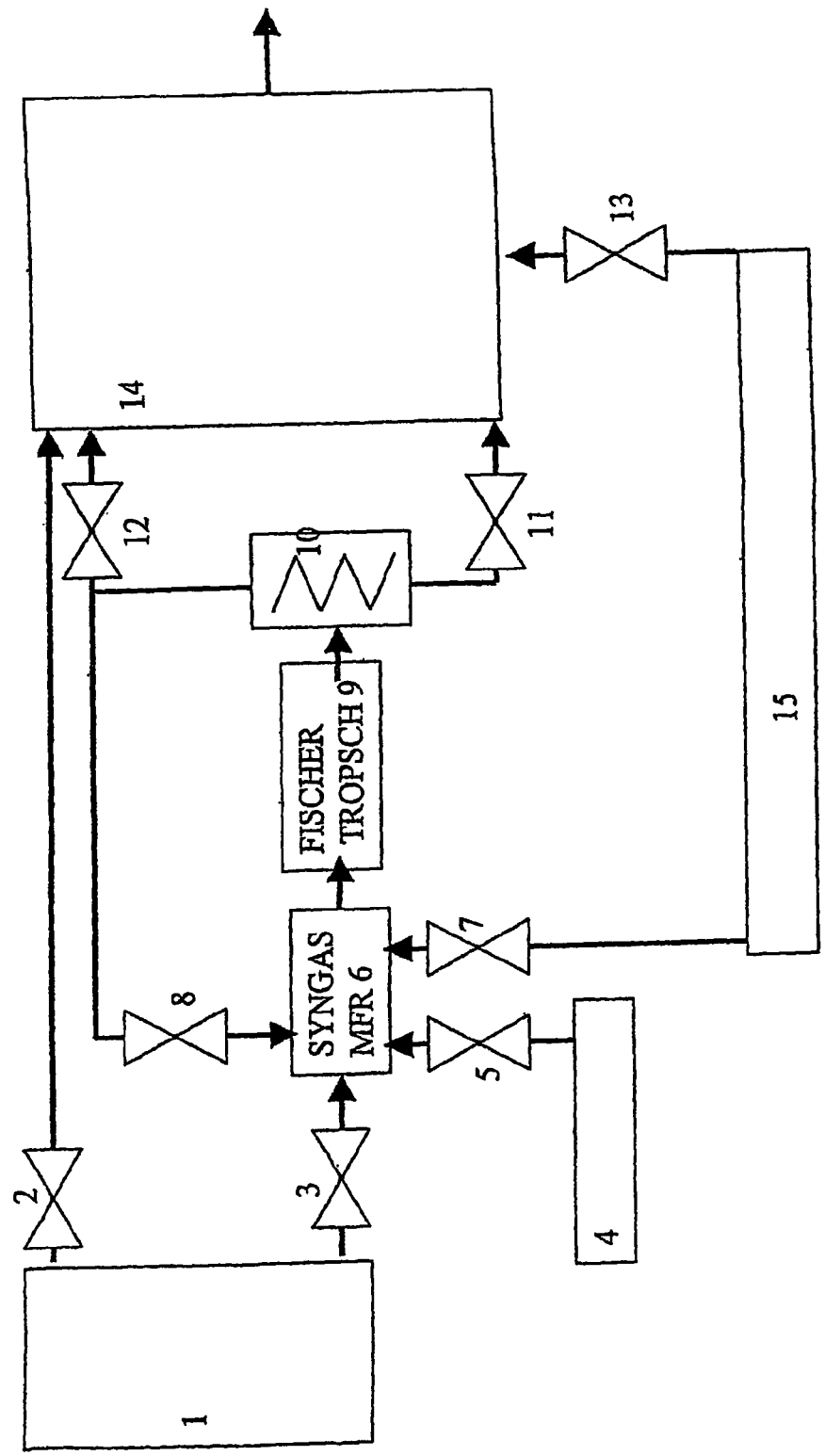
FIG. 1 is a schematic of a configuration for a process according to the invention.

The process of the invention may be represented by the configuration shown in FIG. 1. The hydrocarbon fuel is stored in fuel reservoir or tank (1). A portion of the hydrocarbon fuel from the fuel reservoir can be passed to reformer (6) by means of valve (3). Step (a) of the process of the invention comprises converting hydrocarbon fuel to synthesis gas, i.e. carbon monoxide and hydrogen, also known as syngas. This step is carried out using a reformer. An example of a suitable reformer is that described in WO 99/48805. WO 99/48805 discloses compact technology for a process for the catalytic generation of hydrogen and carbon oxides which combines steam reforming and partial oxidation. In order to perform a steam reforming function, the reformer requires a source (4) of water or steam. In one embodiment of the present invention, water is obtained by condensing the exhaust gas stream from the engine or the vehicle. The addition of steam or water to the reformer is controlled by valve (5). A source (15) of oxygen is also required for the manufacture of synthesis gas. In one embodiment, this source of oxygen is an air inlet system. The addition of oxygen and/or air into the reformer is controlled by valve (7).

Step (b) of the process of the present invention comprises subjecting the synthesis gas produced in step (a) to a Fischer Tropsch process to produce a mixture of hydrocarbons having an octane number less than or a cetane number greater than that of the hydrocarbon fuel from the fuel reservoir. Preferably, this is followed by a condensing step which produces a light gaseous fraction and a heavy fraction. Both the light fraction and the heavy fraction will have an octane number less than or a cetane number greater than that of the hydrocarbon fuel from the fuel reservoir. Preferably the mixture of hydrocarbons produced by the Fischer Tropsch reaction and/or the heavy fraction from the condenser will have an octane number less than 80 or a cetane number greater than 65. The mixture of gases (mainly hydrogen and carbon monoxide) leaving the reformer are passed to a Fischer Tropsch Unit or reactor (9). Preferably, the hydrogen to carbon monoxide ratio in this mixture is in the range of 0.6 to 2.5 part hydrogen gas for every part carbon monoxide. The optimal ratio will depend on the particular Fischer Tropsch catalyst used. Suitable Fischer Tropsch reactors are described in Baird et al. (Ind. Eng. Chem. Prod. ResDev 1980 19 175–191). The reactor may be a fixed bed, fluidized bed or slurry phase reactor. The process may be a high temperature (300–350° C.) Fischer Tropsch process which typically utilises iron-based catalysts or a low temperature (200–240° C.) which typically utilises iron- or cobalt-based catalysts. Preferably the products of the Fischer Tropsch reaction (before condensing) are gaseous as this simplifies the technology making it easier to install onboard a vehicle.

As the Fischer Tropsch reaction is exothermic (requiring heat to be taken away), heat needs to be removed from the reaction. For all Fischer Tropsch catalysts, an increase in temperature results in a shift towards lower carbon products and increases the degree of producing branched chain isomers. Both of these are undesirable given the objective of producing a mixture of hydrocarbons with a low octane number. In a preferred embodiment of the present invention heat from the Fischer Tropsch reaction of step (b) is utilised by the reforming reaction of step (a). This is achieved by thermally integrating the Fischer Tropsch reactor and the reformer. The ratio of oxygen gas to carbon and water to carbon entering the reformer can be used to control whether or not the reforming process is endothermic (requiring an input of heat) or exothermic. By controlling the ratio of water to carbon and the ratio of oxygen gas to carbon entering the reformer, the carbon monoxide to hydrogen gas ratio of the resultant synthesis gas can be controlled and whether the net process for reforming will be endothermic or exothermic or balanced in terms of heat production can be determined. In the process represented by FIG. 1, these ratios are controlled by valves (3), (5), (7) and (8). During a start up phase of the engine, it is appropriate for the reformer to operate in an exothermic mode. Preferably the reformer then switches to an endothermic mode in steady state operation and heat is transferred from the Fischer Tropsch reaction to the reforming process. In one embodiment of the process of the invention heat is transferred from the Fischer Tropsch reaction and used to preheat the reactants in the reformer, i.e. heat is transferred to the reforming process. Even more preferably, heat is transferred directly form the Fischer Tropsch reactor to the reformer, although the extent to which this can happen will depend on the relative temperatures of the Fischer Tropsch reactor and the reformer.

In one embodiment of the invention, an ambient temperature condenser (10) can be used to perform a simple fractionation of the products of the Fischer Tropsch reactor. This condensing step produces a light gaseous fraction and a heavy fraction or condensate. Condensers such as those described in Boyer and Trumfheller (Chemical Engineering, May 1993 issue, McGraw Hill publishing) adapted for an engine are suitable. In a preferred embodiment the cooling water for the condenser is integrated with the cooling system for the HCCI engine and/or the vehicle. The condensate will contain straight chain alkanes with a carbon number of six or higher. These will have an octane rating that is lower than the hydrocarbon fuel and/or have a cetane rating that is higher than the hydrocarbon fuel. The injection of condensate into the HCCI engine is controlled by valve (11). The lighter gaseous fraction from the condenser will have an octane rating that is higher than that of the condensate. If valve (8) is opened and valve (12) is closed, then the light Fischer Tropsch products are recycled to the reformer for synthesis gas manufacture. Thus in an embodiment of the process of the present invention the light fraction in recycled to the reformer for manufacture of synthesis gas. Alternatively, if valve (12) is opened and valve (8) is closed then the light Fischer Tropsch products may be injected directly into the HCCI engine. In step (c) of the process of the invention, either the light or the heavy fraction may be delivered to the HCCI engine.

A portion of the hydrocarbon fuel from the fuel reservoir may be injected into the HCCI engine (14) by operation of valve (2).

In step (d) of the process of the invention, the overall octane or cetane number of the fuel entering the engine is controlled by controlling the amounts of hydrocarbon fuel, light fraction and heavy condensate being delivered to the engine. In the process represented by FIG. 1, these amounts are controlled by valves (2), (11) and (12).

Figure 2:
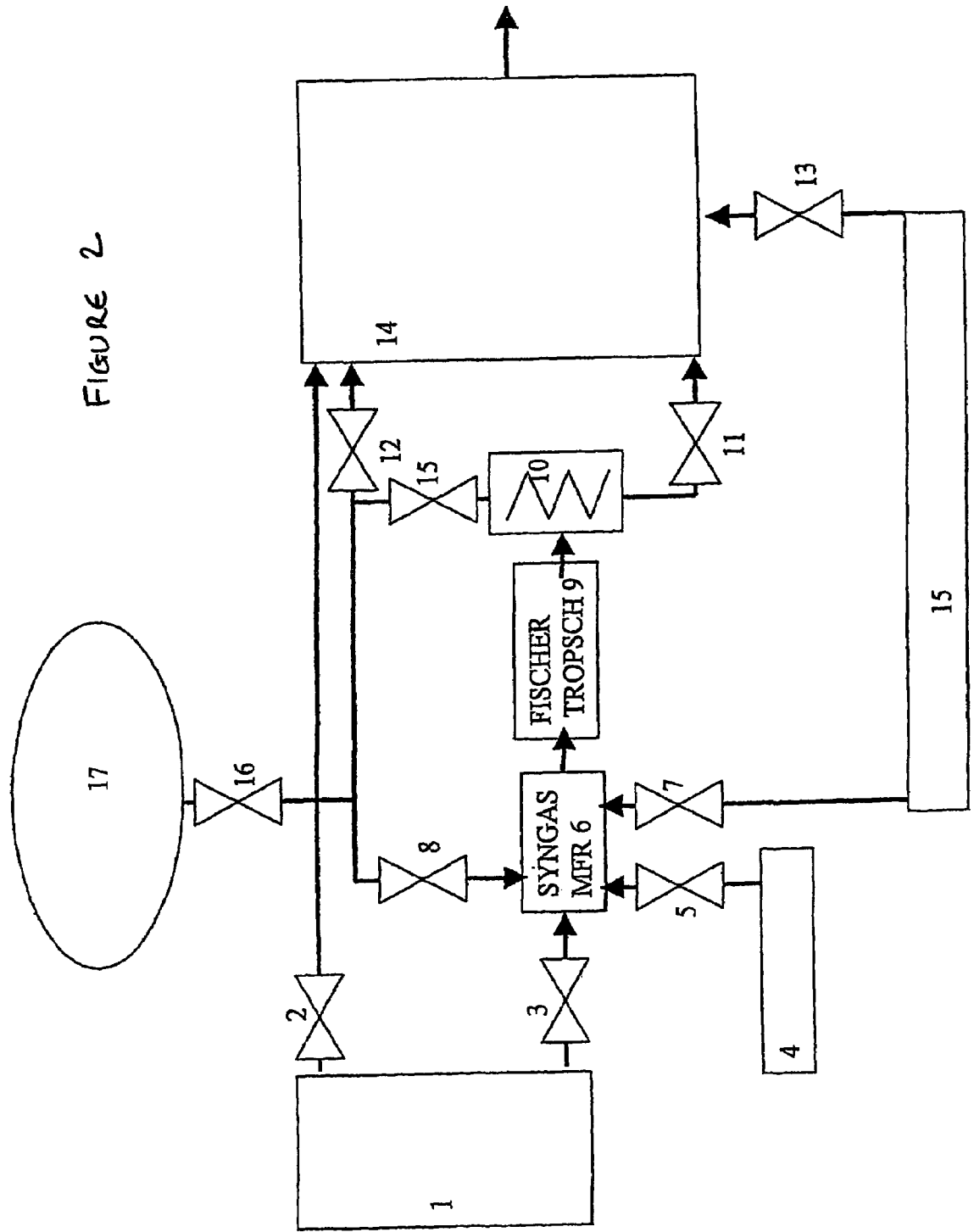
FIG. 2 is a schematic of a process configuration similar to that of FIG. 1 which includes a pressurised container for storing products from the condensing step of step (b) of the process.

In FIG. 2, the light fraction from the condenser passes through a non-return valve (15). If valve (8) is opened and valves (12) and (16) are closed, then the light Fischer Tropsch products are recycled to the reformer (6) for syngas manufacture. Alternatively, if valve (12) is open, and valves (8) and (16) are closed, then the light Fischer Tropsch products are injected directly into the HCCI engine. Alternatively, if valve (16) is opened and valve (8) and (12) are closed, then the lighter fraction can be stored in a pressurised storage container (17). The gas stored in (17) can subsequently be injected into the engine by opening valves (16) and (12) while keeping (8) closed. The stored gas can also be recycled for syngas manufacture by closing valve (12) and opening valves (16) and (8).

Figure 3:
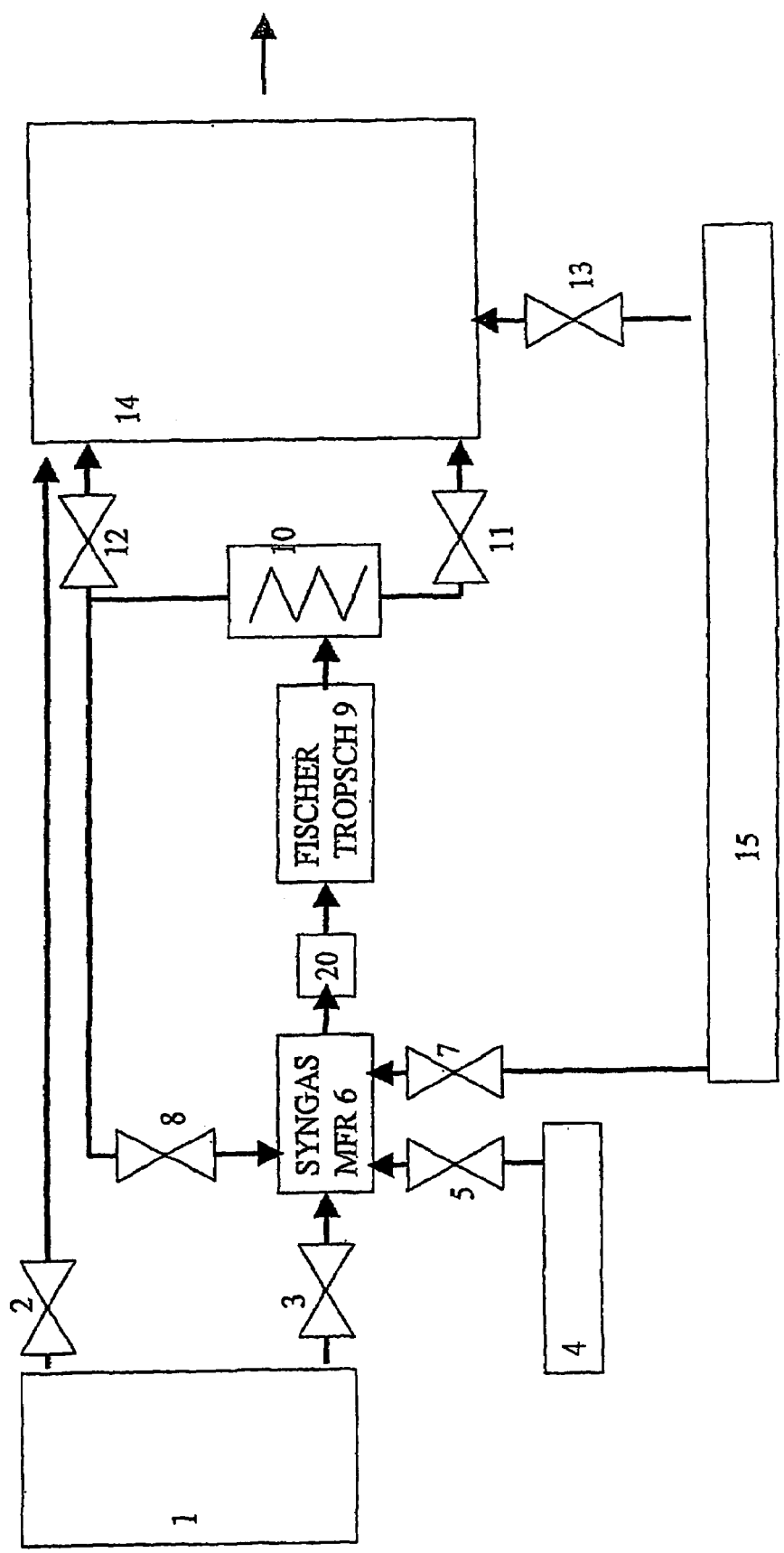
FIG. 3 is a schematic of a process configuration similar to that of FIG. 1 which includes a stage for the removal of sulphur-bearing species.

In FIG. 3, a trap (20) to remove sulphur and/or sulphur-bearing species is introduced between the reformer and the Fischer Tropsch reactor. The trap may comprise, for example, zinc oxide pellets. In this embodiment of the present invention, sulphur is removed from the synthesis gas product of step (a) before it is passed to the Fischer Tropsch reactor of step (b).

In FIG. 4, hydrogen is selectively removed from the gas stream between the reformer and the Fischer-Tropsch reactor by means of a hydrogen removal unit (30). This is so as to further control the carbon monoxide to hydrogen ratio for the inlet to the Fischer Tropsch reactor. The hydrogen removal unit may simply be a palladium membrane. The hydrogen removed may optionally be used to generate electricity in a Proton Exchange Membrane Fuel Cell (31). This leads to enhanced overall efficiency of a vehicle being powered by the engine as the electricity could be used to power a number of auxiliary systems of the vehicle, for example, the air conditioning.

In an embodiment of the present invention, the process for controlling the performance of a HCCI engine comprises a step of monitoring the engine's performance and adjusting the octane or cetane number of the fuel being delivered to the HCCI engine accordingly. Preferably a sensor is provided in the engine and this is used to monitor the engine's performance. Preferably the sensor is a knock sensor. Preferably the engine comprises a engine management chip which receives information from the sensor and processes said information to provide data from which the required adjustment to the octane/cetane number of the fuel, i.e. the amounts of (i) and (ii) in step (c) of the process of the invention, can be determined.

The present invention also provides a HCCI engine and fuel system suitable for use in the above-described process comprising
(a) a fuel reservoir;
(b) a HCCI engine;
(c) a reformer for converting hydrocarbon fuel to synthesis gas;
(d) a reactor for converting synthesis gas to a hydrocarbon mixture using a Fischer Tropsch process;
(e) means for removing a portion of hydrocarbon fuel from the fuel reservoir and delivering it to the reformer;
(f) means for removing synthesis gas product from the reformer and delivering it to the reactor;
(g) means for removing a mixture of hydrocarbons from the Fischer Tropsch reactor and delivering it to the HCCI engine; and
(h) means for removing a portion of hydrocarbon fuel from the fuel reservoir and delivering it to the HCCI engine.

Preferably the HCCI engine and fuel system further comprises (i) a condenser for converting a hydrocarbon mixture produced by the Fischer Tropsch reactor into a light and a heavy fraction and the means specified in (g) includes means for removing a portion of a heavy fraction and/or a light fraction produced by the condenser and delivering it to the HCCI engine.

Means (e) to (i) may comprise a system of valves.

In one embodiment, the HCCI engine and fuel system further comprises a sensor for monitoring the engine's performance. Preferably this sensor is a knock sensor. Preferably this embodiment further comprises an engine management chip.

In a further embodiment of the invention, the HCCI engine and fuel system comprises one or more of:
(a) a pressurised storage container for storing the light fraction produced by the condenser;
(b) a trap for removing sulphur from the synthesis gas being fed into the Fischer Tropsch reactor; and
(c) a hydrogen removal unit for removing hydrogen from the synthesis gas product from the reformer before the synthesis gas is fed to the Fischer Tropsch reactor.

The present invention also provides a vehicle comprising the above-described engine and fuel system.

I claim:

1. A process for controlling the performance of a homogeneous charge compression (HCCI) engine in a vehicle having a hydrocarbon fuel reservoir comprising:
   (a) converting a portion of hydrocarbon fuel from the hydrocarbon fuel reservoir to synthesis gas;
   (b) converting synthesis gas produced in step (a) to a mixture of hydrocarbons having an octane number less than or a cetane number higher than that of the hydrocarbon fuel of the hydrocarbon fuel reservoir using a Fischer Tropsch process;
   (c) delivering (i) a portion of hydrocarbon fuel from the hydrocarbon fuel reservoir and (ii) a portion of the mixture of hydrocarbons produced in step (b) to the HCCI engine; and
   (d) varying the amounts of (i) and (ii) in step (c) in order to adjust the octane or cetane number of the hydrocarbon fuel being supplied to the HCCI engine, thereby adjusting the octane or cetane number of hydrocarbon fuel being supplied to the HCCI engine.

2. The process of claim 1 wherein step (a) comprises steam reforming using a source of water or steam, at least part of the said water or steam required for step (a) is obtained by condensing an exhaust gas stream from the engine or vehicle.

3. The process of claim 1 wherein the synthesis gas used in step (b) has a hydrogen gas to carbon monoxide ratio in the range of 0.6 to 2.5 part hydrogen gas for every part carbon monoxide.

4. The process of claim 1 wherein heat of reaction from the Fischer Tropsch process of step (b) is used to:
   (i) provide heat for the reaction of step (a); and/or
   (ii) preheat the reactants for the reaction of step (a).

5. The process of claim 1 wherein the Fischer Tropsch process in step (b) is followed by a condensing step which produces a light and a heavy fraction and wherein the light and/or the heavy fraction form at least part of the mixture of hydrocarbons in (ii) of step (c).

6. The process of claim 5 wherein the condensing step produces a light fraction and a heavy fraction and at least a part of the light fraction is either
   (a) stored in a pressurised storage container;
   (b) delivered to the HCCI engine; or
   (c) recycled by converting it to synthesis gas in step (a).

7. The process claim 5 wherein cooling water for the condensing step is provided by a cooling system for the HCCI engine or vehicle.

8. The process of claim 1 wherein the process further comprises (e) monitoring the performance of the HCCI engine using a sensor to provide information relating to engine performance and adjusting the octane number or cetane number in response to said information.

9. The process of claim 8 wherein the sensor is a knock sensor.

10. The process of claim 8 wherein an engine management chip receives information from the sensor and processes said information to provide data from which the required amounts of (i) and (ii) of step (c) can be determined.

11. A vehicle comprising the HCCI and fuel system of claim 10.

12. The process claim 6 wherein cooling water for the condensing step is provided by a cooling system for the HCCI engine or vehicle.

13. The process of claim 5 wherein the process further comprises (e) monitoring the performance of the HCCI engine using a sensor to provide information relating to engine performance and adjusting the octane number or cetane number in response to said information.

14. The process of claim 9 wherein an engine management chip receives information from the sensor and processes said information to provide data from which the required amounts of (i) and (ii) of step (c) can be determined.

15. A HCCI engine and fuel system comprising
   (a) a fuel reservoir;
   (b) a HCCI engine;
   (c) a reformer for converting hydrocarbon fuel to synthesis gas;
   (d) a reactor for converting synthesis gas to a hydrocarbon mixture using a Fischer Tropsch process;
   (e) means for removing a portion of hydrocarbon fuel from the fuel reservoir and delivering it to the reformer;
   (f) means for removing synthesis gas product from the reformer and delivering it to the reactor;

(g) means for removing a mixture of hydrocarbons from the Fischer Tropsch reactor and delivering it to the HCCI engine; and (h) means for removing a portion of hydrocarbon fuel from the fuel reservoir and delivering it to the HCCI engine.

16. The HCCI engine and fuel system of claim 15 which further comprises (i) a condenser for converting a hydrocarbon mixture produced by the reactor into a light and a heavy fraction; and the means specified in (g) includes means for removing a portion of the heavy fraction and/or the light fraction produced by the condenser and delivering it to the HCCI engine.

17. The HCCI engine and fuel system of claim 15 or comprising (k) a sensor for monitoring the engine's performance.

18. The HCCI engine and fuel system of claim 17 comprising (1) an engine management chip.

19. The HCCI engine and fuel system of claim 15 which further comprises one or more of:

(a) a pressurised storage container for storing the light fraction produced by the condenser;

(b) a trap for removing sulphur from the synthesis gas being fed into the Fischer Tropsch reactor; and (c) a hydrogen removal unit for removing hydrogen from the synthesis gas product from the reformer before the synthesis gas is fed to the Fischer Tropsch reactor.

20. A vehicle comprising the HCCI and fuel system of claim 19.

* * * * *